United States Patent [19]

Truty et al.

[11] Patent Number: 4,994,643
[45] Date of Patent: Feb. 19, 1991

[54] ELECTRICAL DISCHARGE MACHINE APPARATUS TILTED CURRENT PICKUP

[75] Inventors: Thomas J. Truty, South Barrington; William R. Fricke, Bloomingdale; James M. Ceriale, Green Oaks, all of Ill.; Jule L. French, Yoder; Kevin M. Newell, Marion, both of Ind.

[73] Assignees: Fort Wayne Wire Die, Inc., Fort Wayne, Ind.; T-Star Industrial Electronics Corp., Wheeling, Ill.

[21] Appl. No.: 325,283

[22] Filed: Mar. 17, 1989

[51] Int. Cl.⁵ .............................................. B23H 7/10
[52] U.S. Cl. ................................................. 219/69.12
[58] Field of Search ................ 219/69.12, 69.11, 69.16

[56] References Cited

U.S. PATENT DOCUMENTS

| | | | |
|---|---|---|---|
| 2,066,588 | 1/1937 | Taylor . | |
| 2,974,216 | 3/1961 | Inoue | 219/69.12 |
| 3,943,322 | 3/1976 | Lehmann et al. | 219/69.12 |
| 4,453,070 | 6/1984 | Bonga | 219/69.12 |
| 4,539,459 | 9/1985 | Yamagata | 219/69.12 |
| 4,559,433 | 12/1985 | Aramaki et al. | 219/69.12 |
| 4,564,431 | 1/1986 | Miyano | 204/224 M |
| 4,803,328 | 2/1989 | Obara | 219/69.12 |

FOREIGN PATENT DOCUMENTS

| | | | |
|---|---|---|---|
| 56-76337 | 6/1981 | Japan . | |
| 56-82133 | 7/1981 | Japan . | |
| 60-238233 | 11/1985 | Japan | 219/69.12 |
| 60-249531 | 12/1985 | Japan | 219/69.12 |
| 61-76216 | 4/1986 | Japan | 219/69.12 |
| 61-117015 | 6/1986 | Japan . | |
| 102834 | 5/1988 | Japan | 219/69.12 |

Primary Examiner—Geoffrey S. Evans
Attorney, Agent, or Firm—George Pappas

[57] ABSTRACT

A current pickup assembly for placing electrical current on a moving wire electrode in an electrical discharge machine apparatus and having a normal straight line of travel. The current pickup assembly includes a current pickup having a bore therethrough for receiving the wire electrode. The bore longitudinal axis is at an angle with respect to the normal straight line of wire travel and the moving wire electrode contacts the bore contact wall therein. A pivot means is provided for selectively pivoting the carbide pickup longitudinal axis at an angle with respect to the straight line of wire travel. A rotation means rotates the current pickup about the bore longitudinal axis. In the alternative, the current pickup is supported on a gimball means for selectively pivoting the pickup about two mutually perpendicular and intersecting axes of rotation intersecting at a point. A control shaft connected to the current pickup and engaged with a connecting rod are driven by a drive means through a variable displacement means. Thus, selective angular displacement of the bore longitudinal axis from the normal straight line of wire travel and also rotational movement of the bore longitudinal axis about the normal straight line of wire travel are provided.

71 Claims, 6 Drawing Sheets

ELECTRICAL DISCHARGE MACHINE APPARATUS TILTED CURRENT PICKUP

TECHNICAL FIELD

The present invention relates to the technical field of electrical discharge machine (EDM) apparatuses having a traveling wire electrode. More specifically, the present invention relates to a current pickup assembly wherethrough electrical current is placed on the moving wire electrode having a normal straight line of travel.

BACKGROUND OF THE INVENTION

EDM apparatuses utilizing a moving wire electrode are commonly presently used in making precise cuts and shaping various electrically conductive materials or workpieces. Typically, the wire electrode is wound around and travels between two turning spools and a pair of wire guides or guide assemblies wherethrough the wire travels are used to accurately situate or guide the moving wire electrode at the proper location and/or at angle with respect to the workpiece being cut. The wire and workpiece are placed at different electrical potentials and a controlled electrical spark traveling between the wire and workpiece causes the workpiece to be eroded and cut or shaped in a desired configuration.

It is electrically advantageous to place the electrical current on the moving wire electrode as close to the workpiece as possible and, thus, current pickups are generally placed within or in close proximity to the guide assemblies. An effective way of placing electrical current on the moving wire electrode is to cause the wire to slide or rub against an electrically charged surface, thus, transferring the electrical current therethrough to the moving wire electrode.

Various electrical feed devices have been developed whereat the moving wire electrode slidingly rubs against a conductive surface. In some of these devices, a current pickup is pushed towards the moving wire electrode or is placed in the normal straight line of wire travel and the tension in the wire causes the wire to rub against the current pickup thereby making the electrical contact. A typical current pickup of this character is disclosed in U.S. Pat. No. 4,539,459. Yet other current pickup assemblies, such as those disclosed in U.S. Pat. No. 4,559,433, utilize a plurality of current pickups that are pushed against the moving wire electrode or placed in the normal straight line of travel. In addition, as disclosed in Japanese Patent Application No. 59-195654 published Apr. 18, 1986, current pickups with a bore therethrough have been devised wherein the current pickup bore is offset from the straight line of wire travel and, thus, the moving wire electrode rubs against the interior surface of the bore and making the necessary rubbing electrical contact. So as to increase the life of this current pickup due to wear occurring on the bore wall, the contact pickup is indexed or rotated about the bore axis.

The prior current pickups and assemblies, however, have substantial shortcomings and drawbacks. At the outset, because the moving wire electrode rubs against the current pickup on one side thereof, for example, on one side of the current pickup bore surface, the wire electrode becomes slightly deformed or a "curl", also referred as memory, is placed on the wire thus causing inaccurate cutting and shaping of the workpiece. Without drastically pushing the wire electrode off of the normal straight line of travel with the current pickup, the tension in the wire is minimal and rubbing electrical contact with the current pickup is inefficient. With the current pickup being generally in the normal straight line of wire travel, manual and/or automatic threading of the moving wire electrode through the guide assembly and the current pickup is generally quite difficult. Further, although the present current pickups with a bore can be indexed or rotated, a groove often time forms in the bore wall and the current pickup must be rotated sufficiently so as to prevent the wire electrode from slipping back into that groove, thereby also wasting potential contact surface area therebetween.

Accordingly, a need exists for a current pickup that generally prevents inaccuracies due to curl, provides for increased tension in the wire and, therefore, also minimizing electrical resistance, provides for easy manual and automatic threading through the guide assembly and current pickup and, further, increases the useful life of the current pickup and utilizes a maximum amount of the current pickup bore surface.

SUMMARY OF THE INVENTION

It is the principle object of the present invention to overcome the above-discussed disadvantages associated with prior current pickup assemblies.

The present invention overcomes the disadvantages associated with prior current pickup assemblies by providing a current pickup or body having a bore therethrough and defining a bore longitudinal axis. The bore longitudinal axis is placed at an angle with respect to the normal straight line of wire travel and intersecting the normal straight line of travel substantially at a longitudinal midpoint of the bore. Accordingly, the wire electrode contacts the contact wall on one side at one end of the midpoint and contacts the contact wall on the other side at the other end of the midpoint, cancelling any deformation or curl on the wire electrode and increasing cutting accuracy. Further, by increasing the angle between the normal straight line of wire travel and the bore longitudinal axis, the tension in the wire electrode can be increased, thereby also providing better electrical rubbing or sliding contact and still substantially preventing curl in the wire. The bore is also curvilinear and cylindrically shaped, increasing in diameter outwardly from the midpoint, thus, further providing a smooth sliding contact between the wire electrode and the bore contact wall, preventing deformation in the wire and increasing accuracy.

A pivot means is provided whereby the current pickup is selectively pivoted at a given angle with respect to the normal straight line of wire travel thereby selectively increasing or decreasing the tension in the wire electrode and, also, selectively aligning the bore longitudinal axis with the normal straight line of wire travel and, facilitating and making manual and automatic threading substantially easier. The current pickup is also rotated about the bore longitudinal axis, either manually or automatically, and incrementally or linearly, thereby using substantially all of the bore contact wall and substantially increasing the useful life of the current pickup or conductive body. Furthermore, as the bore contact wall wears, the angle between the bore longitudinal axis and the normal straight line of wire travel can be increased, thereby retaining the necessary tension in the wire, even though the bore contact wall has worn.

The present invention further provides a gimball means whereby the current pickup or conductive body is supported and selectively gimballed about a point along the wire electrode normal straight line of travel whereby the bore longitudinal axis is selectively pivoted about two mutually perpendicular and intersecting axes of rotation intersecting at the point. A control shaft is connected to the current pickup and rotational and cantilever movement of the control shaft causes pivotal movement of the conductive body about the respective intersecting axes of rotation. A connecting rod is cammed between two cam walls, is engaged with the control shaft at its first end, and is pivotally connected to a drive means at its second end so that rotational movement of the connecting rod second end causes simultaneous rotational and cantilever movement of the control shaft and, also, simultaneous rotation of the bore longitudinal axis about the wire electrode normal straight line of travel.

A variable radial displacement means is provided between the drive means and the connecting rod and selectively radially displaces the connecting rod second end pivotal connection from the drive means axis so that, when the pivotal connection is coaxial with the drive means axis, the conductive body bore longitudinal axis and the wire electrode normal straight line of travel are co-linear, thus facilitating manual and automatic threading. Further, by increasing the radial displacement between the drive means axis and the pivotal connection between the connecting rod second end, the angle between the bore longitudinal axis and the normal straight line of wire travel is selectively increased. Accordingly, the tension in the wire electrode is selectively controlled while the current pickup bore contact wall is worn and the useful life of the current pickup is increased by utilizing substantially all of the current pickup bore contact wall.

The present invention provides for various gimballing means including: a ring member pivotally supported in a support assembly about one of two perpendicular and intersecting axes and wherein the current pickup is pivotally supported in the ring member on a control shaft about the other of the perpendicular and intersecting axes; a spring-type assembly wherein a first annular member is supported in a support assembly, two leaf springs extend longitudinally therefrom, a second annular member is connected to the first leaf springs at their other ends, second leaf springs connected to the second annular member and extending longitudinally therefrom and, wherein the conductive body or current pickup is connected to the second leaf springs at their second ends; and, a ball having a center point journalled in a socket and wherein the conductive body is attached to the ball with the bore longitudinal axis intersecting the ball center point.

The wire electrode is guided between a pre guide member and a post guide member in the normal straight line of wire travel and the distance between each guide member and the midpoint of the bore longitudinal axis is equal thereby also providing an equal amount of tension in the wire on both sides of the midpoint and, thus, maximizing electrical rubbing contact while substantially preventing curl in the wire electrode. Further, by rotating or gimballing the current pickup, the useful life is substantially increased and, thus, problems associated with replacing a current pickup that has worn during a cutting process and creating inaccuracies thereby are substantially decreased.

In one form thereof, the present invention is directed to a current pickup assembly for placing electrical current on an electrical discharge machine apparatus moving wire electrode having a normal straight line of travel. The current pickup assembly includes a conductive body having a bore for receiving the wire electrode therethrough and, a wire contact wall. The bore longitudinal axis is at an angle with respect to the normal straight line of wire travel and the moving wire electrode contacts the contact wall.

In one form thereof, the present invention is directed to a current pickup assembly for placing electrical current on an electrical discharge machine apparatus moving wire electrode having a normal straight line of travel. The current pickup assembly includes a conductive body having a bore with a conductive wall for receiving the wire electrode therethrough and, defining a longitudinal axis. A pivot means is provided for supporting the body and selectively pivoting the bore longitudinal axis at an angle with respect to the normal straight line of wire travel so that the moving wire electrode selectively contacts the contact wall.

In one form thereof, the present invention is directed to a current pickup assembly for placing electric current on an electrical discharge machine apparatus moving wire electrode having a normal straight line of travel. The current pickup assembly includes a conductive body having a bore with a contact wall for receiving the wire electrode therethrough and, defining a longitudinal axis. A gimball means is provided for supporting the body and selectively gimballing and pivoting the bore longitudinal axis at a point defined by two mutually perpendicular and intersecting axes of rotation intersecting at the point so that the moving wire electrode may contact the contact wall.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

The specific embodiments, as shown in the figures, relate to current pickup assemblies for placing electric current on an electrical discharge machine apparatus moving wire electrode, as well as guide assemblies for guiding an electrical discharge machine apparatus moving wire electrode.

Figures 1, 2, 5:
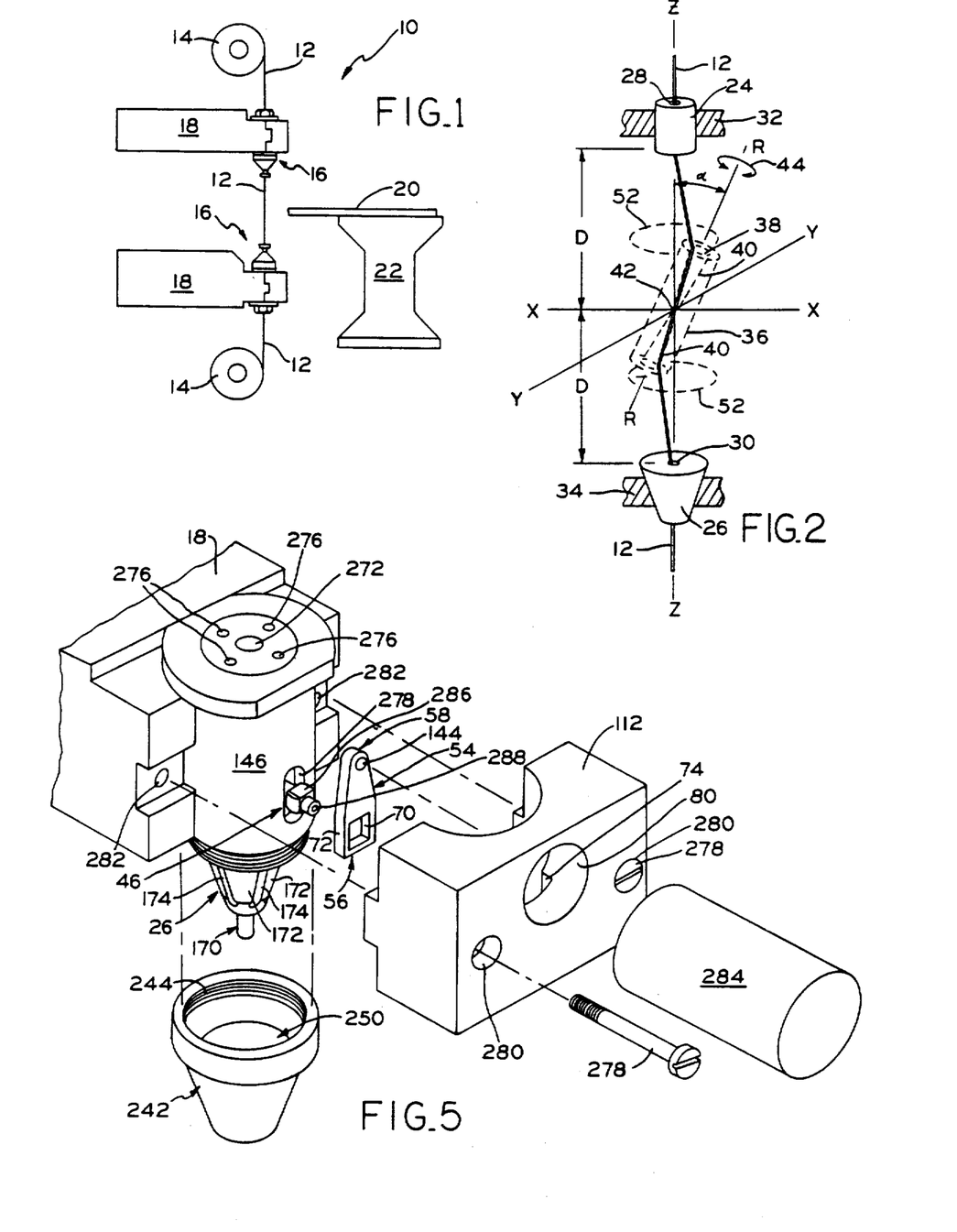
FIG. 1 is a diagrammatic side elevational view of an electrical discharge machine apparatus.
FIG. 2 is a diagrammatic perspective view showing the various operations of the current pickup assemblies in conjunction with a guide assembly according to the present invention.
FIG. 5 is an exploded perspective view of a guide assembly housing a current pickup assembly according to the present invention.

As shown in FIG. 1, an electrical discharge machine, generally indicated as 10, utilizes a wire electrode 12 wrapped around spools 14. Spools 14 are rotated and wire electrode 12 travels therebetween. Wire guide assemblies generally indicated as 16, are mounted on the ends of arms 18. Wire electrode 12 is received through assemblies 16 and is guided thereby. Workpiece 20, generally made of a conductive material, is held on table 22 so that it may be cut and/or shaped by the moving wire electrode 12. More specifically, arms 18 and/or table 22 are moved with respect to one another so that wire electrode 12 may travel through workpiece 20 cutting and shaping the same in a predetermined desired manner. Arms 18 may be displaced with respect to one another and also thereby cutting workpiece 20 at a given desired angle. The cutting and shaping of workpiece 20 is caused by the moving wire electrode 12 as it travels between spools 14 by the placement of a different electrical potential on wire 12 and workpiece 20, thereby causing a spark therebetween and electroeroding workpiece 20 in the proximity of the traveling wire electrode 12.

Figures 3, 4, 9:
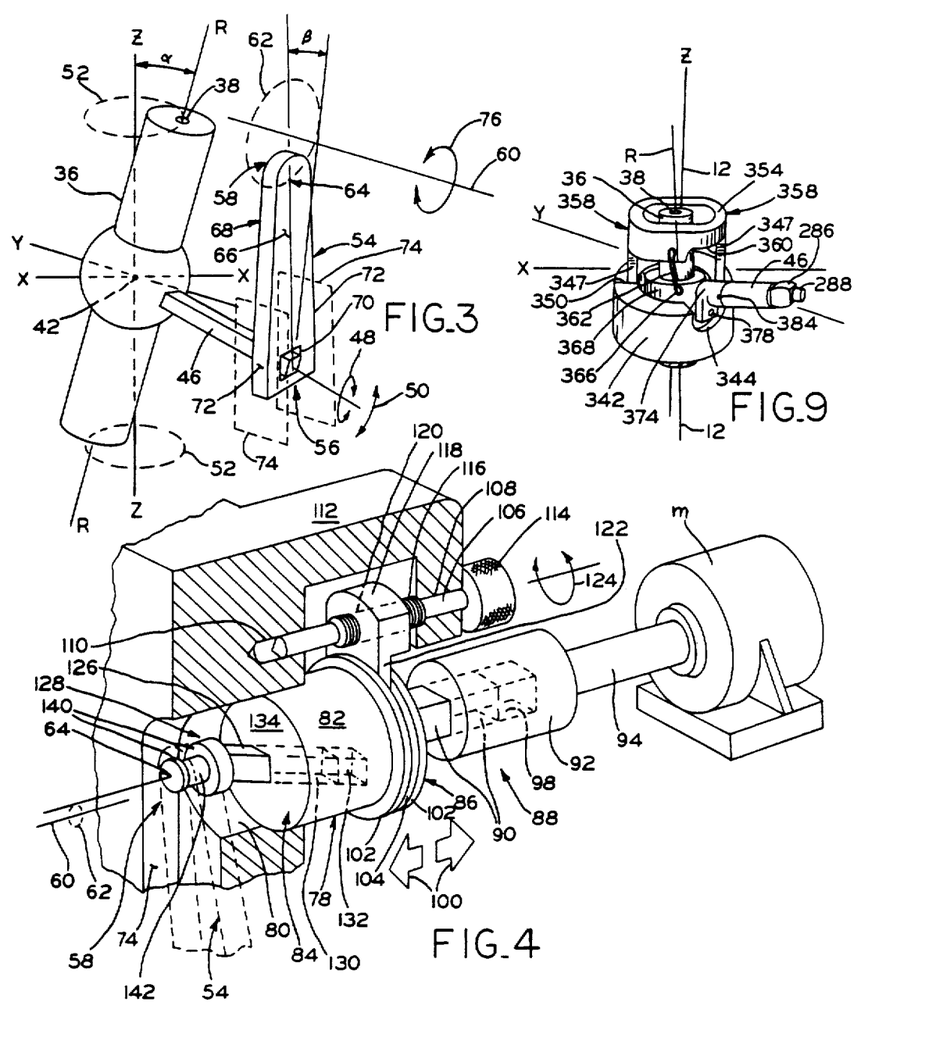
FIG. 3 is a diagrammatic perspective view showing the operation of the control shaft and connecting rod according to the present invention.
FIG. 4 is a cross-sectional perspective view of a typical drive means and variable displacement means according to the present invention.
FIG. 9 is an assembled perspective view of the gimball means shown in FIG. 8 according to the present invention.

The working features of the current pickup assemblies are diagrammatically shown in FIGS. 2 and 3 whereat the X, Y, and Z axes are utilized depicting a three dimensional or perspective diagram. The Z axis defines the normal straight line of travel for moving wire electrode 12 between pre guide member 24 and post guide member 26. Pre guide member 24 includes a bore or hole 28 therethrough and post guide member 26 also includes a bore or hole 30 therethrough. Bores 28 and 30 are adapted for receiving therethrough wire electrode 12 and guiding the same along the Z axis or the normal straight line of travel. Pre guide member 24 is affixed and supported on pre guide support 32 and post guide member 26 is affixed and supported on post guide support 34. A conductive body is depicted in dashed lines and as having a generally cylindrical shape 36. Conductive body 36 is preferably made of tungsten or tungsten carbide. Conductive body 36 includes a bore 38 longitudinally through conductive body 36 and having a longitudinal axis R. Conductive body bore 38 is also depicted in dashed lines and is also depicted as being curvilinear in cross section and cylindrically shaped, increasing in diameter outwardly from the longitudinal midpoint, here shown as the intersection between the X and Y axes. Thus, a contact wall 40 is provided in conductive body 36 here depicted as the wall of conductive body bore 38. Conductive body 36 is electrically connected to a power source (not shown) and transfers or places electrical current on wire electrode 12 as wire electrode 12 rubs or slides against and contacts contact wall 40.

In a first embodiment, according to the present invention, conductive body bore longitudinal axis R is situated at an angle alpha (α) with respect to the Z axis or the normal straight line of wire travel. In this embodiment, angle α is fixed and wire electrode 12 travels through bore 38 and, under normal tension, wire electrode 12 contacts contact wall 40 on one side at one end of midpoint 42 and contacts contact wall 40 on the other side at the other end of midpoint 42. Therefore, deformation or curl of wire electrode 12 is substantially minimized and, thus, cutting accuracy is increased. So as to further minimize deformation or curl of wire electrode 12, guide members 24 and 26 are situated at an equal distance D away from midpoint 42. In this fashion, the tension in wire electrode 12 on both sides of midpoint 42 is substantially equal and, also, the rubbing or contact surface between wire electrode 12 and contact wall 40 is substantially equal on both sides of midpoint 42, thus, equally cancelling any deformation on wire electrode 12 caused by the rubbing thereof against contact wall 40. So as to maximize the useful life of conductive body 36, there is provided a means for rotating conductive body 36 about bore longitudinal axis R as indicated by arrows 44. The means for rotating can be manual or automated. Further, the rotation of conductive body 38 can be linear, thus, causing substantially even wear on contact wall 40 or, in the alternative, can be incremental.

In a second embodiment, a pivot means is provided for supporting conductive body 36 and selectively pivoting the conductive body bore axis R at any desired angle α with respect to the normal straight line of wire travel or the Z axis. In this second embodiment, the benefits of the above-discussed first embodiment are attained. Further, conductive body bore longitudinal axis R can selectively be situated collinear with the Z axis, thus, making manual and/or automatic threading of wire electrode 12 substantially easier. By selectively increasing angle α between longitudinal bore axis R and the Z axis, the tension on wire electrode 12 can also be selectively increased or decreased, thus, also providing selective control of the electrical transfer between contact wall 40 and wire electrode 12 and selective control of the wear of contact wall 40. As with the above-discussed first embodiment, a means for rotating conductive body 36 may also be provided with the second embodiment, thus, substantially fully utilizing contact wall 40 and increasing the useful life thereof. Various means for pivoting and rotating are described hereinbelow.

In yet a third embodiment of the current pickup assembly, a gimball means is provided for supporting conductive body 36 and selectively gimballing the bore longitudinal axis R about midpoint 42. Thus, bore longitudinal axis R may be pivoted about mutually perpendicular and intersecting axes X and Y at a given angle α in an infinite number of planes parallel with the Z axis. As shown in FIG. 3, a control shaft 46 is connected to conductive body 36. By rotating control shaft 46, as indicated by arrows 48 and pivoting or causing cantilever movement of control shaft 46, as indicated by arrows 50, conductive body bore longitudinal axis R can selectively be placed at any given angle α and in any plane that is parallel with the Z axis. Further, by preprogrammed control of the rotational and cantilever movement of control shaft 46 as described hereinbelow, bore longitudinal axis R can be caused to pivot about the X and Y axes so as to rotate about the Z axis as indicated by the dashed ring lines of travel 52 at any given angle α. Accordingly, all the advantages discussed hereinabove with respect to the first and second current pickup assembly embodiments are attained also by this third embodiment. The preprogrammed control of control shaft 46 is achieved with a connecting rod member 54. Connecting rod 54 includes a first end 56 engaging control shaft 46 and a second end 58 pivotally connected to a drive means at pivotal point connection 64. The drive means rotationally moves connecting rod second end 58 about drive means axis 60 as shown in dashed line circle 62. Connecting rod member 54 further includes front face 66 and back face 68. At the first end 56 of connecting rod 54, a generally square aperture or window 70 is provided through connecting rod member 54 with openings in faces 66 and 68. As shown, control shaft 46 is generally square and is received in square aperture 70. Between faces 66 and 68, there are also provided connecting rod cam surfaces 72 slidingly engaging cam walls 64, shown in FIG. 3 in dashed lines.

Upon rotational movement of second end 58 of connecting rod 54 about pivot point 64 via the drive means, about the drive means axis 60 as indicated by arrows 76, through the engagement of control shaft 46 with connecting rod 54 in aperture 70, control shaft 46 is both rotated as indicated by arrows 48 and moved upward and downward in a cantilever fashion as indicated by arrows 50. Depending on the radial distance between drive means axis 60 and pivot point connection 64, control shaft 46 is pivoted as indicated by arrows 48 at an angle beta β. Accordingly, through the rotational movement of the second end 58 of connecting rod 54 about drive means axis 60, conductive body longitudinal bore R is rotated about the Z axis or the wire electrode normal straight line of travel as indicated by dashed ring lines of travel 52. Furthermore, angle β is proportional to angle α and by selectively radially displacing pivot point connection 64 from drive means axis 60, angle α and the radial displacement of longitudinal bore axis R as indicated by dashed lines 52 can be selectively controlled.

Figure 7:
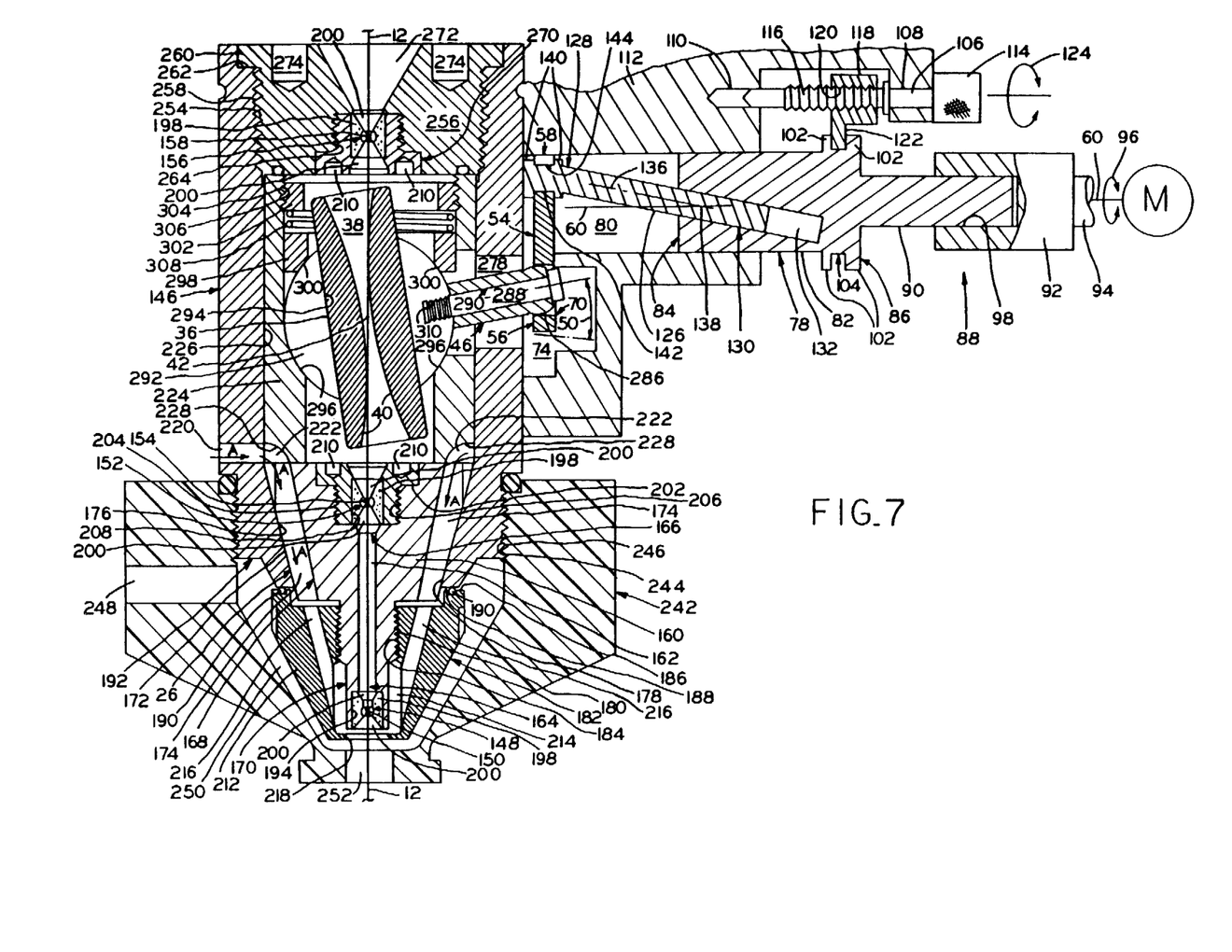
FIG. 7 is a cross-sectional view showing a current pickup assembly using one type of gimball means in conjunction with the guide assembly, variable displacement means, and drive means according to the present invention.

The radial displacement between drive means axis 60 and pivot point connection 64 is selectively controlled via a variable radial displacement means located between the drive means and connecting rod 54. As shown in FIGS. 4 and 7, a plunger generally indicated as 78 is received in sleeve or cylindrical opening 80. Plunger 78 has an exterior cylindrical surface 82 and is adapted for reciprocal and rotational movement in sleeve 80. Plunger 78 includes a first end 84 and a second end 86. Plunger 78 is rotatably driven at its second end 86 thereof by a drive means or motor M through a longitudinally expandable coupling generally indicated as 88. Coupling 88 includes a square shaft 90 connected to plunger 78 at its second end 86 and a coupling member 92 connected to motor M via motor shaft 94 and rotatably driven by motor M as indicated by arrows 96. Coupling member 92 includes a longitudinal square hollow coaxially aligned with drive means axis 60 and adapted to reciprocally receive square shaft 90 therein. Thus, plunger 78 can be reciprocally moved along drive means axis 60 within sleeve 80 as indicated by arrows 100 while rotatably driven via longitudinally expandable coupling 88 and motor M.

The reciprocal movement of plunger 78 can be controlled manually or automatically and a typical manual plunger reciprocal movement control is shown in FIGS. 4 and 7. More specifically, plunger 78 includes annular rings 102 near the second end 86 and defining an annular groove 104 therebetween. An adjustment screw 106 is journalled in bores 108 and 110 of support structure 112. Adjustment screw 106 includes a control knob 114 and a threaded portion 116 threadingly engaging ear 118. Ear 118 includes a threaded bore 120 for threadingly receiving threaded portion 116 of adjustment screw 106 and, further, includes a tongue portion 122 received within annular groove 104. Tongue portion 122 slidingly engages annular rings 102 as plunger 78 is rotated about drive means axis 60, thus, by selectively rotating adjustable screw 106 as indicated by arrows 124, ear 118 is selectively reciprocated thereby also causing plunger 78 to be selectively reciprocally moved along drive means axis 60.

It is contemplated that various other means can be provided for moving plunger 78 reciprocally along drive means axis 60. For example, plunger 78 can be housed in a pneumatic cylinder and air pressure supplied selectively within the pneumatic cylinder in chambers formed on the ends 84 and 86 of plunger 78 thereby selectively reciprocating plunger 78 therein. Further, in such pneumatic embodiment, a stop can be incorporated for selectively placing plunger 78 at a desired longitudinal position within the pneumatic cylinder at the end of the particular stroke thereof and, thus, controlling the radial displacement between drive means axis 60 and pivot point connection 64.

At the first end 84 of plunger 78, there is provided a drive shaft 126 having a first end indicated as 128 and a second end indicated as 130. A drive shaft bore 132 is provided in plunger 78 extending therein from face 134 of plunger 78. Drive shaft bore 132 is substantially square shaped with a longitudinal drive shaft bore axis 136 situated at an angle with respect to drive means axis 60 and intersecting therewith at a point 138. Drive shaft 126 is also substantially square shaped and is adapted to be slidingly received in drive shaft bore 132.

At the first end 128, drive shaft 126 is pivotally connected to connecting rod 54 about pivot point 64. This pivotal connection is adapted to prevent longitudinal movement thereat of drive shaft 126 via retention rings 140 and/or by other suitable means. Cylindrical shaft 142 is journalled in cylindrical hole 144 for pivotal movement therebetween as described hereinabove. Accordingly, reciprocal longitudinal movement of plunger 78 causes reciprocal sliding of drive shaft 126 within drive shaft bore 132 and, thereby, providing selective radial displacement of pivotal point connection 64 from drive means axis 60. More specifically, movement of plunger 78 away from connecting rod 54 causes the greatest radial displacement while movement of plunger 78 towards connecting rod 54 coaxially aligns pivotal point connection 64 with drive means axis 60. Thus, the movement of plunger 78 away from connecting rod 54 increases angle $\alpha$ between the normal straight line of wire travel and the longitudinal bore axis R of conductive body 36 while situating point 64 coaxial with drive means axis 60, also coaxially aligns longitudinal bore axis R with the normal straight line of wire travel.

The various current pickup assemblies are received and supported within a barrel 146 and are adapted to work in conjunction with wire guide assemblies 16. More specifically, wire guide assemblies 16 include a first guide member or means 148 also referred to as the final guide and having a bore 150 therethrough, a second guide member or means 152 also referred to as the post guide and having a bore 154 therethrough and, a third guide member or means 156 also referred to as the pre guide and having a bore 158 therethrough. Bores 150, 154, and 158 receive the moving wire electrode 12 therethrough and guide the wire in the normal straight line of wire travel. The various current pickup assemblies are located between second guide or post guide member 152 and third guide or pre guide member 156 and first guide or final guide member 148 is located on the working end of guide assembly 16 or closest to workpiece 18.

Figures 10, 11, 12, 13, 14:
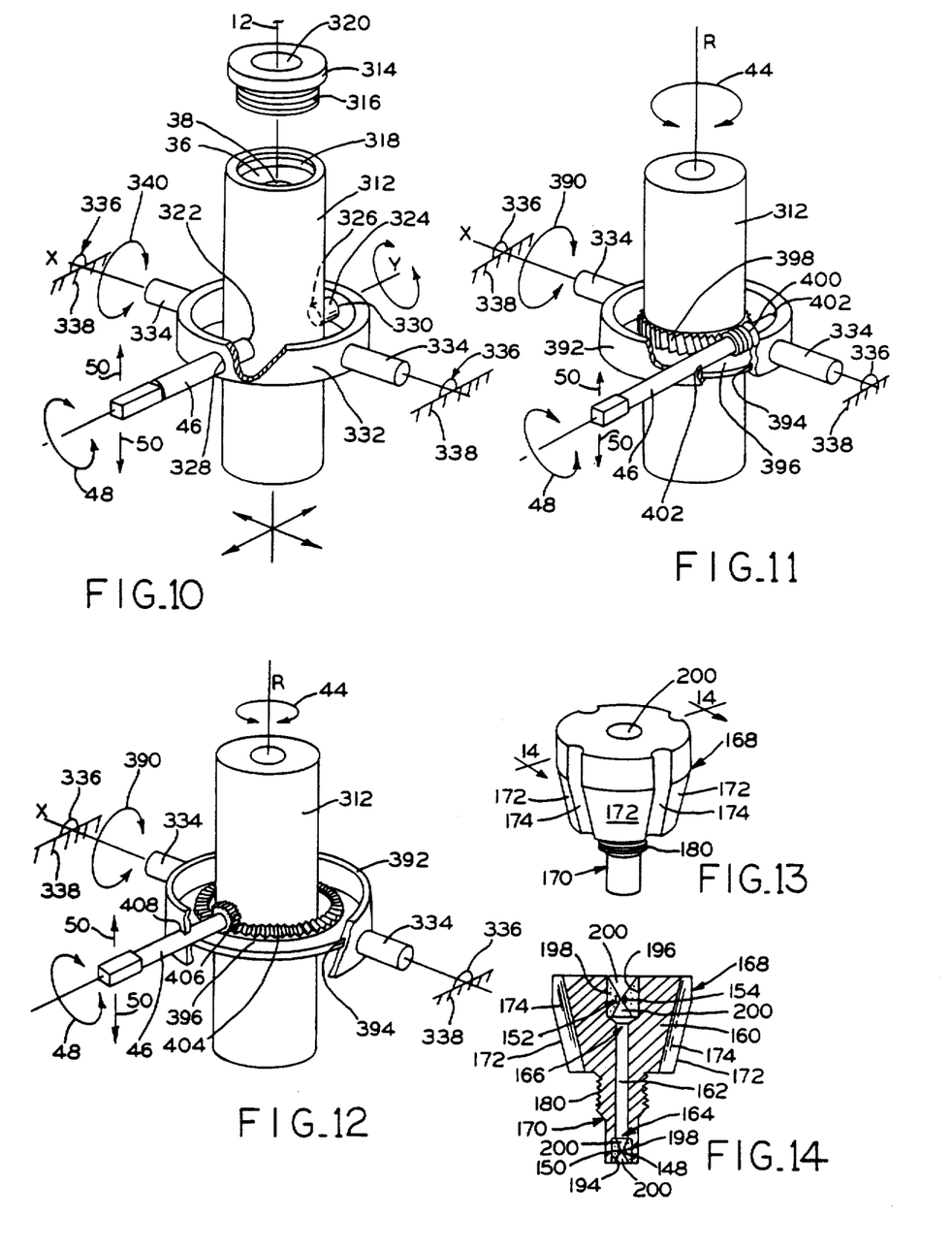
FIG. 10 is a perspective diagrammatic view of another gimball means according to the present invention.
FIG. 11 is a diagrammatic perspective view of a pivot means in conjunction with a rotation means according to the present invention.
FIG. 12 is a perspective diagrammatic view of another pivot means and rotation means according to the present invention.
FIG. 13 is a perspective view of a typical guide assembly post guide member according to the present invention.
FIG. 14 is a cross-sectional view of the post guide member shown in FIG. 13.

Post guide 26 includes a post guide holder body 160 having a wire passageway 162 therethrough between a first opening 164 and a second opening 166, post guide holder body 160 includes an enlarged portion generally indicated as 168 and a thinner portion generally indicated as 170. Enlarged portion 168 includes outer frusto-conically shaped walls 172 and fluid channels 176 extending generally longitudinally thereon. A guide support is provided on barrel 146 and, more specifically, at one end of barrel 146. A frusto-conical inner surface 176 is formed converging toward a hole or opening 178. Enlarged portion 168 of post guide holder body 160 is larger than guide support hole 178 and walls 172 thereof seat against frusto-conical inner surface 176 and, thus, also form fluid channels 174 therebetween. However, thinner portion 170 of post guide holder body 160 is smaller than guide support hole 178 and is, thus, received therethrough as shown. Threads 180 are provided on thinner portion 170 and a guide nut means or member 182 includes threads 184 adapted for mating engagement with the thinner portion threads 180. Accordingly, upon mating engagement of nut member threads 184 with thinner portion threads 180, nut member annular flat 186 is forced against annular flat 188, compressing O-ring member 190 and, in a clamping fashion, locking guide holder body 160 and nut member 182 upon frusto-conical end 192 of barrel 146.

As more clearly shown in FIG. 14, guide body 16 includes a first counter bore 194 communicating with passageway 162 through first opening 164 and, also, includes a second counter bore 196 communicating with passageway 162 through second opening 166. Guide members 148 and 152 are mounted or fixed within respective counterbores 194 and 196 in a mounting material 198. Mounting material 198 substantially surrounds the guide members and conical passageways 200 are formed therein converging towards bores 150 and 154 of respective guide members 148 and 152. Preferably, guide members 148 and 152 are made of diamond, polycrystalline or single-crystal, sapphire, cubic boron nitride or other sufficiently wear-resistant materials and, mounting material 198 is made of sintered metal. Guide holder body 160 is preferably made of stainless steel.

Figures 6, 8:
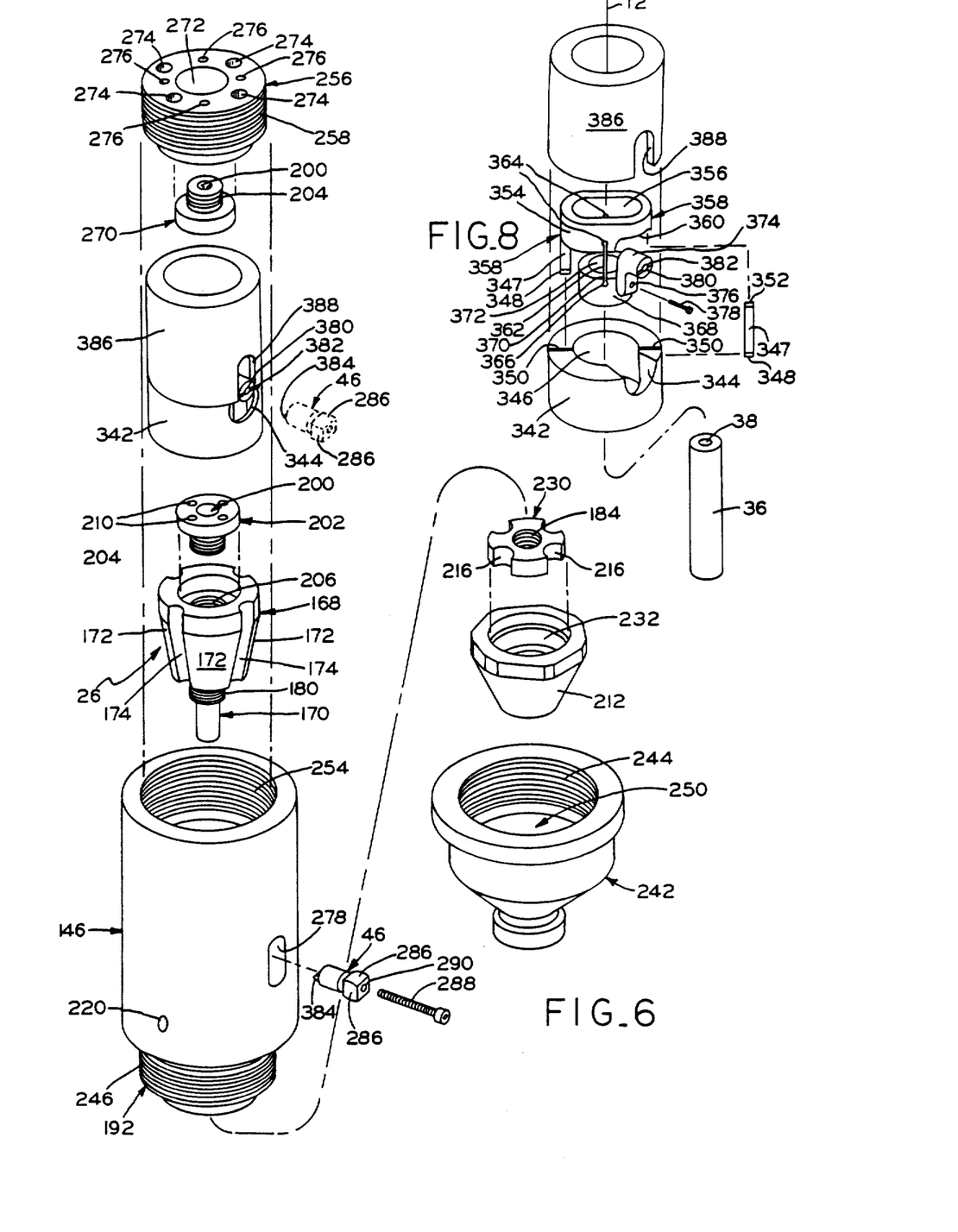
FIG. 6 is an exploded perspective view of the guide assembly shown in FIG. 5 according to the present invention.
FIG. 8 is an exploded perspective view of another gimball means according to the present invention.

Second guide member 152, in the alternative, can be fixed or mounted to guide holder body 160 via a plug 202 as shown in FIGS. 6 and 7. Plug 202 includes an exterior threaded surface 204 threadingly received in threaded cylindrical bore 206. Plug 202 includes a wire passageway having a counterbore or bore portion 208 wherein second guide member 152 is mounted in a mounting material 198 as described hereinabove with respect to FIG. 14. Plug 202 further includes tool holes 210 for receiving a mating tool and rotating plug 202 for threadingly engaging threads 206. Plug 202 is preferably made of stainless steel.

Guide nut member 182, in addition to locking guide holder body 160 to the end of barrel 146, aids in the automatic threading of a wire electrode 12 through guide assembly 16 and/or aids in the flushing of workpiece 18. In this regard, guide nut member 182 includes a housing 212 defining a fluid passageway 214 substantially surrounding guide body thinner portion 170. A plurality of inlet ports 216 are provided through housing 212 and communicating with fluid passageway 214 and, also, an outlet port 218 is provided and communicates with fluid passageway 214. When guide nut member 182 is threadingly received on post guide thinner portion 170, channels 174, defined in enlarged portion 168 of guide holder body 160, are aligned with fluid inlet ports 216. Further, a plurality of threading fluid ports 220 are provided in barrel 146 and communicating with an annular fluid passageway 222 formed between sleeve member 224 and the interior surface 226 of barrel 146. Annular fluid passageway 222 includes a curvilinear wall 228 for providing a smooth transition of fluid from threading fluid ports 220 to channels 174. For creating a threading or flushing jet at outlet port 218, a fluid such as deionized water under pressure, is forced as indicated by arrows A through threading fluid ports 220 around annular fluid passageway 222 into channels 174 and aligned inlet port 216 of nut member 182 into fluid passageway 214 and out through outlet port 218. Thus, outlet port 218 receives therethrough both wire electrode 12 and a threading or flushing fluid.

Figure 15:
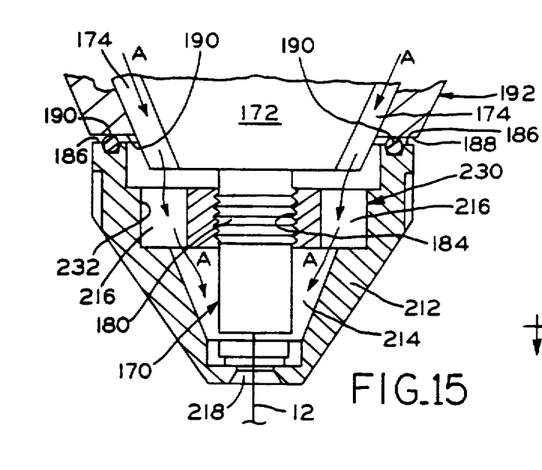
FIG. 15 is a cross-sectional view of a nut member assembled on the post guide member at the end of a barrel according to the present invention.
Figure 16:
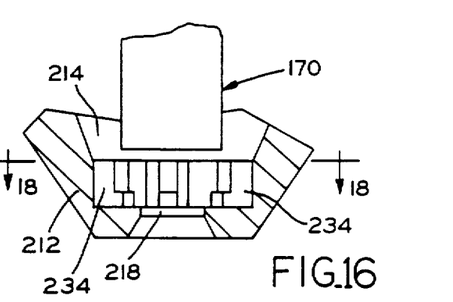
FIG. 16 is a partial cross-sectional view of the nut member shown in FIG. 15 and showing the fluid vanes thereon according to the present invention shown in FIG. 16, however, depicting an enlarged conical outlet bore; and, FIG. 18 is a cross-sectional view of the nut member taken along line 18 of FIG. 16 according to the present invention.

In an alternative embodiment of guide nut member 182, as shown in FIGS. 6 and 15–18, threads 184 and inlet ports 216 are formed in cross member 230. Cross member 230 is frictionally forced or press fit in bore 232 or affixed therein by any other suitable means. Thus, fluid received in channels 174, as shown in FIG. 15, travels through inlet ports 216 into fluid passageway 214 and out through outlet bore 218.

So as to provide substantially laminar fluid flow out through outlet port 218, ports 220, channels 174, inlet ports 216, fluid passageway 214, and outlet port 218, are sized so as to continually and gradually decrease in fluid flow area.

Furthermore, as shown in FIGS. 15-18, fluid passageway 214 is provided with fluid vanes 234 and defining radial fluid passageways 236 wherethrough the threading fluid flows from fluid passageway 214 and out through outlet port 218. Vanes 234 may include a land 238 whereupon guide body thinner portion 170 may rest.

Figure 17:
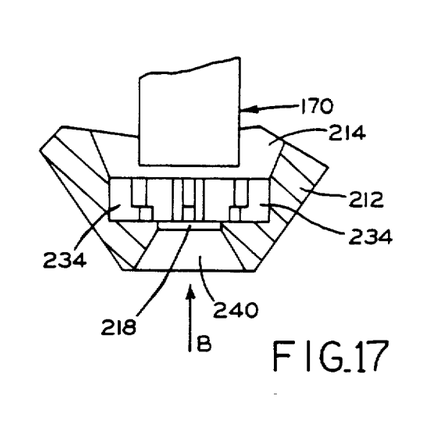
Figure 18:
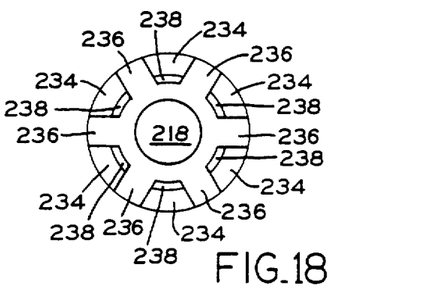

As shown in FIG. 17, outlet port 218 may include an enlarged frusto-conical portion 240 whereby during automatic threading, a wire electrode 12 being received through outlet 218, as indicated by arrow B, is aided in finding its way into the bore 150 of first guide member 148.

At the frusto-conical end 192 of barrel 146 there is also provided a flushing nozzle 242 having a threaded interior bore 244 for mating engagement with threads 246 of barrel 146. Flushing nozzle 242 includes a flushing fluid inlet 248, a conical passageway 250 surrounding post guide member 26 and a flushing outlet port 252. Flushing fluid is thus received in nozzle 242 through inlet 248 into conical passageway 250 and out through flushing outlet port 252 and onto workpiece 18 thereby flushing the same.

Barrel 146, at the other end of frusto-conical end 192 includes a threaded interior surface portion 254. A cylindrical member 256 having exterior surface threads 258 is threadingly received in barrel 146 and engaging threads 254. Cylindrical member 256 includes an annular lip 260 adapted to rest on annular seat 262 thereby positively longitudinally placing third guide member 156. A wire passageway including threaded bore 264 is provided in cylindrical member 256 and a plug 270 is threadingly received therein. Plug 270 is identical to plug 202 except that third guide member 156, made of the same materials as members 148 and 152, is mounted therein. A frusto-conical portion 272 is formed in cylindrical member 256 and leads to conical passageway 200 formed in mounting material 198. Tool holes 274 are also provided in cylindrical member 256 for twisting and threadingly engaging cylindrical member 256 within barrel 146. Further, outlet bores 276 shown in FIG. 6 extend longitudinally through cylindrical member 256 and allow gases and/or fluid to exit from within barrel 146.

The various current pickup assemblies are situated within barrel 146 between second guide member 152 and third guide member 156 and with a control shaft 46 extending through a longitudinal bore 278 on the wall of barrel 146. As shown in FIG. 5, barrel 146 can be retained or fixed on an arm 18 by clamping barrel 146 between arm 18 and support structure 112. Support structure 112 is affixed to arm 18 via threaded screws 278 received through holes 280 in support structure 112 and threadingly engaged in threaded holes 282 in arm 18. As shown, cam walls 74 are formed in support structure 112 and connecting rod 54 engaging control shaft 46 is cammed thereagainst. In FIG. 5, the above-discussed radial displacement means and drive means are diagrammatically indicated as 284.

For aiding the smooth movement of control shaft 46 as indicated by arrows 48 and 50, the square walls of control shaft 46 received within square aperture 70 of connecting rod 54 are rounded as indicated at 286. Further, a threaded screw 288 is received through a longitudinal bore 290 and used to secure control shaft 46 to conductive body 36 and/or the various current pickup assemblies.

The various means for rotating, means for pivoting, and gimball means are described hereinafter. A first gimball means is shown in FIG. 7 wherein a ball or sphere 292 is journalled in a socket means and conductive body 36 is fixed in a bore 294 extending through ball 292. The socket means includes a first annular curvilinear surface 296 formed in sleeve member 224. Within sleeve member 224 there is also received ring member 298 wherein there is formed second annular curvilinear surface 300. A second ring member 302 threaded on its exterior surface 304 threadingly engages interior threaded surface 306 of sleeve 224. A compression spring 308 having an outer diameter smaller than the inside diameter of sleeve 224 is received between first ring member 298 and second ring member 302 and serves to push ring member 298 against ball 292, thus, journalling ball 292 between surfaces 296 and 300. It is contemplated that other socket assemblies can be used. For example, rather than using a sleeve 224 two ring members having annular curvilinear surfaces can be used for journalling ball 292 and a compression spring situated between cylindrical member 256 and one of the ring members.

Ball 292 further includes a threaded bore 310 for threadingly receiving screw 288 and attaching control shaft 46 thereon. Thus, through rotational movement as indicated by arrows 48 and cantilever movement as indicated by arrows 50, current pickup body 36 is pivoted about the X and Y axes as described hereinabove. It should also be noted that an electrical power supply is connected to barrel 146 (not shown) and because barrel 146, sleeve 224, ball 292 and conductive body 36 are made of conductive materials, current is transferred and placed on wire electrode 12 as it contacts contact wall 40.

In FIG. 10, there is shown an alternate gimball means. More specifically, a conductive body holder 312 is provided for receiving therein a conductive body 36 and retained therein with a cap 314. Cap 314 has threads 316 threadingly engaging threads 318 within conductive body holder 312. Cap 314 includes an opening 320 and the other end of conductive body holder 312 also has an opening (not shown) and, thus, wire electrode 12 travels through cap 314, conductive body 36 and conductive body holder 312.

Conductive body 312 is connected to control shaft 46 at 322 and is connected to stud 324 at 326. Control shaft 46 and stud 324 are pivotally connected or journalled at 328 and 330 respectively to ring member 332. Thus, rotational movement of control shaft 46, as indicated by arrows 48, causes pivotal movement of conductive body holder 312 about the Y axis.

Along the X axis, there are provided shaft members 334 which are connected to ring member 332. Shaft members 334 are pivotally connected at 336 in a support assembly generally indicated as 338 and which can be in barrel 146. Accordingly, cantilever movement of control shaft 46 as indicated by arrows 50 causes pivotal movement of conductive body holder 312 about the X axis as indicated by arrows 340. Shaft members 334, control shaft 46, stud 324 and conductive body holder 312 are made of conductive materials and electrical current can, thus, be transferred to conductive body 36 by applying current to shaft members 334 through support assembly 338. In the alternative, a braided wire or the like can be attached to conductive body holder 312 and connected to the power source. It should also be noted that conductive body 36 can itself be pivotally connected to ring member 332 without utilizing conductive body holder 312.

In yet a different gimball means, as shown in FIGS. 6, 8, and 9, a first annular member 342 is supported in a support assembly such as within barrel 146. First annular member 342 includes a notch 344 and an inner bore 346. A first spring means such as leaf springs 347 are connected at their first end 348 at 350 to first annular member 342. Connections 350 can be a longitudinal slot cut into first annular member 342 and receiving first end 348 of leaf spring 347. Leaf springs 347 extend longitudinally from first annular member 342 and are adapted for cantilever movement at their second end 352 with respect to the first annular member in a first plane or generally about a line formed between connections 350 of leaf springs 347 to first annular member 342. A second annular member 354 is generally oval-shaped and has an inner cavity 356. Second annular member 354 is connected to leaf springs 347 at their second ends 352 thereof at the longitudinal ends 358 of second annular member 354. Second annular member 354 also includes a notch 360 located longitudinally above notch 344.

Second spring means or two other leaf springs 362 are connected to the second annular member 354 at 364. Connections 364 of leaf springs 362 are identical to connections 350 and leaf springs 362 extend longitudinally therefrom towards first annular member 342 and, because second annular member 354 is oval-shaped and connections 364 are at the shortest radial distance from the Z axis, leaf springs 362 extend to within inner bore 346 of first annular member 342. Accordingly, the second ends 366 are adapted for cantilever movement about a line defined between connections 364 in a second plane perpendicular to the first plane.

A third annular member 368 is connected to leaf springs 362 at connections 370 in a similar fashion as connections 350. Third annular member 368 includes a conductive body receiving bore 372 adapted to receive therein conductive body or pickup 36. An L-shaped arm 374 is connected to third annular member 368 and includes a threaded hole 376 through L-shaped arm 374 and third annular member 368. A small screw 378 is received in and through threaded hole 376 and when conductive body 36 is situated within third annular member 368 as shown in FIG. 9, serves to lock or clamp conductive body 36 within third annular member 368. At the other end of L-shaped arm 374, there is a threaded hole 380 and a screwdriver-type groove 382. An elongate projection 384 is provided on the end of control shaft 46 and is adapted to be received in groove 382. Screw 288 is received through longitudinal bore 290 of control shaft 46 and threadingly engages threaded hole 380 for connecting control shaft 46 to L-shaped arm 374. Elongate projection 384 and groove 382 prevent rotational slippage of control shaft 46 when control shaft is pivoted as indicated by arrows 48.

Accordingly, rotational movement of control shaft 46 causes conductive body 36 to pivot about the Y axis while cantilever movement of control shaft 46 causes conductive body 36 to pivot about the X axis. A sleeve member 386 is received over second annular member 354 and enclosing the same as shown in FIG. 6 without preventing the gimballing movement of conductive body 36. Sleeve member 386 includes a notch 388 aligned with notch 344 of first annular member 342 and, thus, providing an opening wherethrough control shaft 46 is connected to L-shaped arm 374.

This gimballing means utilizing spring means provides pivotal movement of conductive body 36 about two perpendicular and intersecting axes as with the other gimball means. Further, current is placed on first annular member 342 by contacting the support structure or barrel 146 and is advantageously delivered to conductive body 36 with constant positive electrical connections and without having to pass through any pivotal or journalled connections.

In FIGS. 11 and 12, there are shown the preferred second embodiments of the current pickup assemblies wherein a pivot means is provided for supporting conductive body 36 and selectively pivoting the same about the X axis as indicated by arrows 390. More specifically, a ring member 392 having an annular groove 394 is connected to shaft members 334. Shaft members 334 are pivotally connected at 336 to a support structure or assembly diagrammatically shown as 338 and which can be, for example, barrel 146. Conductive body holder 312 and/or conductive body 36 are connected to an annular washer or journal member 396 journalled in annular groove 394 and thereby providing rotational movement of conductive body holder 312 and/or conductive body 36 about the longitudinal bore axis R as indicated by arrows 44.

In FIG. 11, a worm gear 398 is formed or connected to conductive body 36 or holder 312 and a mating worm 400 is connected to or formed on control shaft 46. Control shaft 46 is pivotally connected to ring member 392 in two holes 402 and, thus, placing worm 400 in mating engagement with worm gear 398. By rotating control shaft 46, as indicated by arrows 48, conductive body 36 or holder 312 may be pivoted about bore longitudinal axis R as indicated by arrows 44. Further, cantilever movement of control shaft 46 as indicated by arrows 50, causes ring member 392, conductive body 362, or holder 312 and the body longitudinal axis R to pivot about the X axis and, thus, placing the bore longitudinal axis R at an angle α with respect to the normal straight line of wire travel.

In FIG. 12, a bevel gear 404 is connected to or formed on annular washer or journal member 396 and a mating pinion 406 is formed or connected to control shaft 46. Control shaft 46 is pivotally connected or journalled in hole 408 and places pinion 406 in mating engagement with bevel gear 404. As described with respect to FIG. 11, rotational and cantilever movement of control shaft 46 pivots conductive body 36 or holder 312 about the X axis and rotates the same about longitudinal bore axis R.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A current pickup assembly for placing electric current on an electrical discharge machine apparatus moving wire electrode having a normal straight line of travel, said current pickup assembly comprising:
a conductive body;

a bore in said conductive body for receiving the wire electrode therethrough, said bore having a longitudinal axis and a wire contact wall;

wherein said bore longitudinal axis is at an angle with respect to the normal straight line of wire travel, and whereby the moving wire electrode contacts said contact wall; and, means for rotating said body about said bore longitudinal axis.

2. A current pickup assembly for placing electric current on an electrical discharge machine apparatus moving wire electrode having a normal straight line of travel, said current pickup assembly comprising:

a conductive body;

a bore in said conductive body for receiving the wire electrode therethrough, said bore having a longitudinal axis and a wire contact wall;

wherein said bore longitudinal axis is at an angle with respect to the normal straight line of wire travel, and whereby the moving wire electrode contacts said contact wall;

a pre guide member with a guide bore on one side of said body and a post guide member with a guide bore on the other side of said body, wherein said pre and post guide members guide the wire electrode through said respective guide bores in the normal straight line of travel; and, a final guide member with a guide bore located on one side of said post guide member opposite said body, said final guide member also guiding the wire electrode through said final guide bore in the normal straight line of travel.

3. The current pickup assembly of claim 2 wherein said final guide member includes a diamond portion, said final guide member bore formed in said final guide diamond portion.

4. A current pickup assembly for placing electric current on an electrical discharge machine apparatus moving wire electrode having a normal straight line of travel, said current pickup assembly comprising:

a conductive body;

a bore in said conductive body for receiving the wire electrode therethrough, said bore having a longitudinal axis and a wire contact wall;

wherein said bore longitudinal axis is at an angle with respect to the normal straight line of wire travel, and whereby the moving wire electrode contacts said contact wall; and, wherein said bore longitudinal axis intersects the normal straight line of travel substantially at a longitudinal midpoint of said bore, whereby in cross-section, the wire electrode contacts said contact wall on one side at one end of said midpoint and contacts said contact wall on the other side at the other end of said midpoint.

5. The current pickup assembly of claim 4 wherein said bore contact wall is curvilinear in cross-section, said bore being cylindrically shaped and increasing in diameter outwardly from said midpoint.

6. The current pickup assembly of claim 5 further comprising means for rotating said body about said bore longitudinal axis.

7. The current pickup assembly of claim 6 further comprising a pre guide member with a guide bore on one side of said body, a post guide member with a guide bore on the other side of said body, and a final guide member with a guide bore located on one side of said post guide member opposite said body, wherein said pre, post, and final guide members guide the wire electrode through said respective guide bores in the normal straight line of travel and wherein said guide members each include a diamond portion, said bores formed in said respective diamond portions.

8. The current pickup assembly of claim 4 further comprising a pre guide member with a guide bore on one side of said body and a post guide member with a guide bore on the other side of said body, wherein said pre and post guide members guide the wire electrode through said respective guide bores in the normal straight line of travel and wherein the distances from said midpoint of said bore to said pre and post guide members are substantially equal.

9. The current pickup assembly of claim 8 wherein said pre and post guide members each include a diamond portion, said bores formed in said respective pre and post diamond portions.

10. The current pickup assembly of claim 8 further comprising a final guide member with a guide bore located on one side of said post guide member opposite said body, said final guide member also guiding the wire electrode through said final guide bore in the normal straight line of travel and wherein said guide members each include a diamond portion, said bores formed in said respective diamond portions.

11. The current pickup assembly of claim 8 further comprising means for rotating said body about said bore longitudinal axis.

12. A current pickup assembly for placing electric current on an electrical discharge machine apparatus moving wire electrode having a normal straight line of travel, said current pickup assembly comprising:

a conductive body;

a bore in said conductive body for receiving the wire electrode therethrough, said bore having a longitudinal axis and a wire contact wall; and, pivot means for supporting said body and selectively pivoting said bore longitudinal axis at an angle with respect to the normal straight line of wire travel, whereby the moving wire electrode selectively contacts said contact wall.

13. The current pickup assembly of claim 12 further comprising means for rotating said body about said bore longitudinal axis.

14. The current pickup assembly of claim 13 wherein said pivot means includes a ring member pivotally supported in a support assembly and wherein said rotating means includes a journal member rotatably connecting said body in said ring.

15. The current pickup assembly of claim 14 wherein said rotating means further includes a worm gear on said body and a mating worm on a control shaft, said control shaft also being pivotally connected to said ring member, whereby rotation of said control shaft causes said body to rotate about said bore longitudinal axis and cantilever movement of said control shaft causes said ring member, body, and body longitudinal axis to pivot and selectively place said bore longitudinal axis at an angle with respect to the normal straight line of wire travel.

16. The current pickup assembly of claim 14 wherein said rotating means further includes a bevel gear on said journal member and a mating pinion on a control shaft, said control shaft also being pivotally connected to said ring member, whereby rotation of said control shaft causes said body to rotate about said bore longitudinal axis and cantilever movement of said control shaft causes said ring member, body, and body longitudinal axis to pivot and selectively place said bore longitudinal axis at an angle with respect to the normal straight line of wire travel.

17. The current pickup assembly of claim 12 further comprising a pre guide member with a guide bore on one side of said body and a post guide member with a guide bore on the other side of said body, wherein said pre and post guide members guide the wire electrode through said respective guide bores in the normal straight line of travel.

18. The current pickup assembly of claim 17 wherein said pre and post guide members each include a diamond portion, said bores formed in said respective pre and post guide diamond portions.

19. The current pickup assembly of claim 17 further comprising a final guide member with a guide bore located on one side of said post guide member opposite said body, said final guide member also guiding the wire electrode through said final guide bore in the normal straight line of travel.

20. The current pickup assembly of claim 19 wherein said final guide member includes a diamond portion, said final guide member bore formed in said final guide diamond portion.

21. The current pickup assembly of claim 12 wherein said bore longitudinal axis intersects the normal straight line of travel substantially at a longitudinal midpoint of said bore, whereby in cross-section, the wire electrode contacts said contact wall on one side at one end of said midpoint and contacts said contact wall on the other side at the other end of said midpoint.

22. The current pickup assembly of claim 21 wherein said bore contact wall is curvilinear in cross-section, said bore being cylindrically shaped and increasing in diameter outwardly from said midpoint.

23. The current pickup assembly of claim 22 further comprising means for rotating said body about said bore longitudinal axis.

24. The current pickup assembly of claim 21 further comprising a pre guide member with a guide bore on one side of said body and a post guide member with a guide bore on the other side of said body, wherein said pre and post guide members guide the wire electrode through said respective guide bores in the normal straight line of travel and wherein the distances from said midpoint of said bore to said pre and post guide members are substantially equal.

25. The current pickup assembly of claim 24 wherein said pre and post guide members each include a diamond portion, said bores formed in said respective pre and post guide member diamond 26. The current pickup assembly of claim 24 further comprising a final guide member with a guide bore located on one side of said post guide member opposite said body, said final guide member also guiding the wire electrode through said final guide bore in the normal straight line of travel and wherein said guide members each include a diamond portion, said bores formed in said respective diamond portions.

27. The current pickup assembly of claim 24 further comprising means for rotating said body about said bore longitudinal axis.

28. The current pickup assembly of claim 27 wherein said pivot means includes a ring member pivotally supported in a support assembly and wherein said rotating means includes a journal member rotatably connecting said body in said ring.

29. The current pickup assembly of claim 28 wherein said rotating means further includes a worm gear on said body and a mating worm on a control shaft, said control shaft also being pivotally connected to said ring member, whereby rotation of said control shaft causes said body to rotate about said bore longitudinal axis and cantilever movement of said control shaft causes said ring member, body, and body longitudinal axis to pivot and selectively place said bore longitudinal axis at an angle with respect to the normal straight line wire travel.

30. The current pickup assembly of claim 28 wherein said rotating means further includes a bevel gear on said journal member and a mating pinion on a control shaft, said control shaft also being pivotally connected to said ring member whereby, rotation of said control shaft causes said body to rotate about said bore longitudinal axis and cantilever movement of said control shaft causes said ring member, body, and body longitudinal axis to pivot and selectively place said bore longitudinal axis at an angle with respect to the normal straight line of wire travel.

31. A current pickup assembly for placing electric current on an electrical discharge machine apparatus moving wire electrode having a normal straight line of travel, said current pickup comprising:
 a conductive body;
 a bore in said conductive body for receiving the wire electrode therethrough, said bore having a longitudinal axis and a wire contact wall; and,
 gimball means for supporting said body and selectively gimballing and pivoting said bore longitudinal axis about a point defined by two mutually perpendicular and intersecting axes of rotation whereby the moving wire electrode may contact said contact wall.

32. The current pickup assembly of claim 31 further comprising a control shaft connected to said body whereby rotation of said shaft causes said body longitudinal axis to pivot about one of said perpendicular and intersecting axis and cantilever movement of said control shaft causes said body longitudinal axis to pivot about the other of said perpendicular and intersecting axis.

33. The current pickup assembly of claim 32 further comprising a connecting rod cammed between two cam walls and having a first end and a second end, said first end engaging said control shaft and said second end being pivotally connected to a drive means for rotational movement of said second end of said connecting rod about a drive means axis and, wherein said rotational movement of said second end of said connecting rod causes simultaneous rotational and cantilever movement of said control shaft and rotation of said bore longitudinal axis about said wire electrode normal straight line of travel.

34. The current pickup assembly of claim 33 further comprising variable radial displacement means between said drive means and said connecting rod for selectively radially displacing said connecting rod second end pivotal connection from said drive means axis and, wherein when said pivotal connection is coaxial with said drive means axis, said conductive body bore longitudinal axis and the wire electrode normal straight line of travel are co-linear.

35. The current pickup assembly claim 34 wherein said radial displacement means includes a plunger received in a sleeve, said plunger adapted for reciprocal and rotational movement in said sleeve and being rotatably driven at one end thereof by said drive means through a longitudinally expandable coupling, and including a drive shaft pivotally connected at one end to said connecting rod second end pivotal connection and slidingly received in a drive shaft bore extending in said plunger at the other end of said coupling, said drive shaft bore having an axis at an angle with respect to said drive means axis whereby reciprocal movement of said plunger in said sleeve causes reciprocal movement of said drive shaft in said drive shaft bore and radial displacement of said connecting rod second end pivotal connection from said drive means axis.

36. The current pickup assembly of claim 35 wherein said conductive body bore longitudinal axis intersects the normal straight line of travel substantially at a midpoint of said bore whereby, in cross-section, the wire electrode contacts said contact wall on one side at one end of said midpoint and contacts said contact wall on the other side at the other end of said 37. The current pickup assembly of claim 36 wherein said bore contact wall is curvilinear in cross-section, said bore being cylindrically shaped and increasing in diameter outwardly from said midpoint.

38. The current pickup assembly of claim 36 further comprising a pre guide member with a guide bore on one side of said body and a post guide member with a guide bore on the other side of said body, wherein said pre and post guide members guide the wire electrode through said respective guide bores in the normal straight line of travel and wherein the distances from said midpoint of said bore to said pre and post guide members are substantially equal.

39. The current pickup assembly of claim 38 wherein said pre and post guide members each include a diamond portion, said bores formed in said respective pre and post guide member diamond portions.

40. The current pickup assembly of claim 38 further comprising a final guide member with a guide bore located on one side of said post guide member opposite said body, said final guide member also guiding the wire electrode through said final guide bore in the normal straight line of travel and wherein said guide members each include a diamond portion, said bores formed in said respective diamond portions.

41. The current pickup assembly of claim 31 further comprising a pre guide member with a guide bore on one side of said body and a post guide member with a guide bore on the other side of said body, wherein said pre and post guide members guide the wire electrode through said respective guide bores in the normal straight line of travel.

42. The current pickup assembly of claim 41 wherein said pre and post guide members each include a diamond portion, said bores formed in said respective pre and post guide member diamond portions.

43. The current pickup assembly of claim 41 further comprising a final guide member with a guide bore located on one side of said post guide member opposite said body, said final guide member also guiding the wire electrode through said final guide bore in the normal straight line of travel.

44. The current pickup assembly of claim 43 wherein said final guide member includes a diamond portion, said final guide member bore formed in said final guide diamond portion.

45. The current pickup assembly of claim 31 wherein said gimball means includes a ring member pivotally supported in a support assembly about one of said perpendicular and intersecting axis and said body is pivotally supported in said ring member on a control shaft about the other of said perpendicular and intersecting axis, whereby rotation of said control shaft causes said body longitudinal axis to pivot about one of said perpendicular and intersecting axis and cantilever movement of said control shaft causes said body longitudinal axis to pivot about the other of said perpendicular and intersecting axis.

46. The current pickup assembly of claim 45 further comprising:
a connecting rod cammed between two cam walls and having a first end and a second end, said first end engaging said control shaft and said second end being pivotally connected to a drive means for rotational movement of said second end of said connecting rod about a drive means axis and, wherein said rotational movement of said second end of said connecting rod causes simultaneous rotational and cantilever movement of said control shaft and the rotation of said bore longitudinal axis about said wire electrode normal straight line of travel;
variable radial displacement means between said drive means and said connecting rod for selectively radially displacing said connecting rod second end pivotal connection from said drive means axis and, wherein when said pivotal connection is coaxial with said drive means axis, said conductive body bore longitudinal axis and said wire electrode normal straight line of travel are co-linear; and,
wherein said radial displacement means includes a plunger received in a sleeve, said plunger adapted for reciprocal and rotational movement in said sleeve and being rotatably driven at one end thereof by said drive means through a longitudinally expandable coupling, and including a drive shaft pivotally connected at one end to said connecting rod second end pivotal connection and slidingly received in a drive shaft bore extending in said plunger at the other end of said coupling, said drive shaft bore having an axis at an angle with respect to said drive means axis whereby reciprocal movement of said plunger in said sleeve causes reciprocal movement of said drive shaft in said drive shaft bore and radial displacement of said connecting rod second end pivotal connection from said drive means axis.

47. The current pickup assembly of claim 46 wherein said bore longitudinal axis intersects the normal straight line of travel at said point whereat said two mutually perpendicular and intersecting axes intersect, whereby in cross-section the wire electrode contacts said contact wall on one side at one end of said point and contacts said contact wall on the other side of said 48. The current pickup assembly of claim 47 further comprising a pre guide member with a guide bore on one side of said body, a post guide member with a guide bore on the other side of said body, and a final guide member with a guide bore located on one side of said post guide member opposite said body, wherein said pre, post, and final guide members guide the wire electrode through said respective guide bores in the normal straight line of travel and wherein said guide members each include a diamond portion said bores formed in said respective diamond portions.

49. The current pickup assembly of claim 47 further comprising a pre guide member with a guide bore on one side of said body and a post guide member with a guide bore on the other side of said body, wherein said pre and post guide members guide the wire electrode through said respective guide bores in the normal straight line of travel and wherein the distances from said point to said first and second guide members are substantially equal.

50. The current pickup assembly of claim 45 wherein said bore longitudinal axis intersects the normal straight line of travel at said point whereat said two mutually perpendicular and intersecting axes intersect, whereby in cross-section the wire electrode contacts said contact wall on one side at one end of said point and contacts said contact wall on the other side of said point.

51. The current pickup assembly of claim 50 further comprising a pre guide member with a guide bore on one side of said body, a post guide member with a guide bore on the other side of said body, and a final guide member with a guide bore located on one side of said post guide member opposite said body, wherein said pre, post, and final guide members guide the wire electrode through said respective guide bores in the normal straight line of travel and wherein said guide members each include a diamond portion, said bores formed in said respective diamond portions.

52. The current pickup assembly of claim 50 further comprising a pre guide member with a guide bore on one side of said body and a post guide member with a guide bore on the other side of said body, wherein said pre and post guide members guide the wire electrode through said respective guide bores in the normal straight line of travel and wherein the distances from said point to said first and second guide members are substantially equal.

53. The current pickup assembly or claim 31 wherein said gimball means includes:
   a first annular member supported in a support assembly;
   first spring means connected to said first annular member at one end thereof and extending longitudinally therefrom, said first spring means adapted for cantilever movement at the other end thereof in a first plane;
   a second annular member connected to said first spring means at said other end of said first spring means;
   second spring means connected to said second annular member at one end thereof and extending longitudinally therefrom and adapted for cantilever movement at the other end thereof in a second plane perpendicular to said first plane; and,
   wherein said conductive body is connected to said second spring means at said second end thereof.

54. The current pickup assembly of claim 53 further comprising a control shaft connected to said conductive body and whereby rotation of said shaft causes said body longitudinal axis to pivot about one of said perpendicular and intersecting axes and cantilever movement of said control shaft causes said body longitudinal axis to pivot about the other of said perpendicular and intersecting axes.

55. The current pickup assembly of claim 54 further comprising:
   a connecting rod cammed between two cam walls and having a first end and a second end, said first end engaging said control shaft and said second end being pivotally connected to a drive means for rotational movement of said second end of said connecting rod about a drive means axis and, wherein said rotational movement of said second end of said connecting rod causes simultaneous rotational and cantilever movement of said control shaft and the rotation of said bore longitudinal axis about said wire electrode normal straight line of travel;
   variable radial displacement means between said drive means and said connecting rod for selectively radially displacing said connecting rod second end pivotal connection from said drive means axis and wherein when said pivotal connection is coaxial with said drive means axis, said conductive body bore longitudinal axis and said wire electrode normal straight line of travel are co-linear; and,
   wherein said radial displacement means includes a plunger received in a sleeve, said plunger adapted for reciprocal and rotational movement in said sleeve and being rotatably driven at one end thereof by said drive means through a longitudinally expandable coupling, and including a drive shaft pivotally connected at one end to said connecting rod second end pivotal connection and slidingly received in a drive shaft bore extending in said plunger at the other end of said coupling, said drive shaft bore having an axis at an angle with respect to said drive means axis whereby reciprocal movement of said plunger in said sleeve causes reciprocal movement of said drive shaft in said drive shaft bore and radial displacement of said connecting rod second end pivotal connection from said drive means axis.

56. The current pickup assembly of claim 55 wherein said bore longitudinal axis intersects the normal straight line of travel at said point whereat said two mutually perpendicular and intersecting axes intersect, whereby in cross-section the wire electrode contacts said contact wall on one side at one end of said point and contacts said contact wall on the other side of said point.

57. The current pickup assembly of claim 56 further comprising a pre guide member with a guide bore on one side of said body, a post guide member with a guide bore on the other side of said body, and a final guide member with a guide bore located on one side of said post guide member opposite said body, wherein said pre, post, and final guide members guide the wire electrode through said respective guide bores in the normal straight line of travel and wherein said guide members each include a diamond portion, said bores formed in said respective diamond portions.

58. The current pickup assembly of claim 56 further comprising a pre guide member with a guide bore on one side of said body and a post guide member with a guide bore on the other side of said body, wherein said pre and post guide members guide the wire electrode through said respective guide bores in the normal straight line of travel and wherein the distances from said point to said pre and post guide members are substantially equal.

59. The current pickup assembly of claim 53 wherein said bore longitudinal axis intersects the normal straight line of travel at said point whereat said two mutually perpendicular and intersecting axes intersect, whereby in cross-section the wire electrode contacts said contact wall on one side at one end of said point and contacts said contact wall on the other side of said point.

60. The current pickup assembly of claim 59 further comprising a pre guide member with a guide bore on one side of said body, a post guide member with a guide bore on the other side of said body, and a final guide member with a guide bore located on one side of said second guide member opposite said body, wherein said pre, post, and final guide members guide the wire electrode through said respective guide bores in the normal straight line of travel and wherein said guide members each include a diamond portion, said bores formed in said respective diamond portions.

61. The current pickup assembly of claim 59 further comprising a pre guide member with a guide bore on one side of said body and a post guide member with a guide bore on the other side of said body, wherein said pre and post guide members guide the wire electrode through said respective guide bores in the normal straight line of travel and wherein the distance from said point to said pre and post guide members are substantially equal.

62. The current pickup assembly of claim 31 wherein said gimball means includes a ball having a center point journalled in a socket means, said conductive body attached to said ball with said bore longitudinal axis intersecting said ball center point.

63. The current pickup assembly of claim 62 further comprising a control shaft connected to said body and whereby rotation of said shaft causes said body longitudinal axis to pivot about one of said perpendicular and intersecting axes and cantilever movement of said control shaft causes said body longitudinal axis to pivot about the other of said perpendicular and i axes.

64. The current pickup assembly of claim 63 further comprising a connecting rod cammed between two cam walls and having a first end and a second end, said first end engaging said control shaft and said second end being pivotally connected to a drive means for rotational movement of said second end of said connecting rod about a drive means axis and, wherein said rotational movement of said second end of said connecting rod causes simultaneous rotational and cantilever movement of said control shaft and the rotation of said bore longitudinal axis about said wire electrode normal straight line of travel;
- variable radial displacement means between said drive means and said connecting rod for selectively radially displacing said connecting rod second end pivotal connection from said drive means axis and wherein when said pivotal connection is coaxial with said drive means axis, said conductive body bore longitudinal axis and said wire electrode normal straight line of travel are co-linear; and,
- wherein said radial displacement means includes a plunger received in a sleeve, said plunger adapted for reciprocal and rotational movement in said sleeve and being rotatably driven at one end thereof by said drive means through a longitudinally expandable coupling, and including a drive shaft pivotally connected at one end to said connecting rod second end pivotal connection and slidingly received in a drive shaft bore extending in said plunger at the other end of said coupling, said drive shaft bore having an axis at an angle with respect to said drive means axis whereby reciprocal movement of said plunger in said sleeve causes reciprocal movement of said drive shaft in said drive shaft bore and radial displacement of said connecting rod second end pivotal connection from said drive means axis.

65. The current pickup assembly of claim 64 wherein said bore longitudinal axis intersects the normal straight line of travel at said point whereat said two mutually perpendicular and intersecting axes intersect, whereby in cross-section the wire electrode contacts said contact wall on one side at one end of said point and contacts said contact wall on the other side of said point.

66. The current pickup assembly of claim 65 further comprising a pre guide member with a guide bore on one side of said body, a post guide member with a guide bore on the other side of said body, and a final guide member with a guide bore located on one side of said post guide member opposite said body, wherein said pre, post, and final guide members guide the wire electrode through said respective guide bores in the normal straight line of travel and wherein said guide members each include a diamond portion, said bores formed in said respective diamond portions.

67. The current pickup assembly of claim 65 further comprising a pre guide member with a guide bore on one side of said body and a post guide member with a guide bore on the other side of said body, wherein said pre and post guide members guide the wire electrode through said respective guide bores in the normal straight line of travel and wherein the distances from said point to said first and second guide members are substantially equal.

68. The current pickup assembly of claim 62 said bore longitudinal axis intersects the normal straight line of travel at said point whereat said two mutually perpendicular and intersecting axes intersect, whereby in cross-section the wire electrode contacts said contact wall on one side at one end of said point and contacts said contact wall on the other side of said point.

69. The current pickup assembly of claim 68 further comprising a pre guide member with a guide bore on one side of said body, a post guide member with a guide bore on the other side of said body, and a final guide member with a guide bore located on one side of said post guide member opposite said body, wherein said pre, post, and final guide members guide the wire electrode through said respective guide bores in the normal straight line of travel and wherein said guide members each include a diamond portion, said bores formed in said respective diamond portions.

70. The current pickup assembly of claim 68 further comprising a pre guide member with a guide bore on one side of said body and a post guide member with a guide bore on the other side of said body, wherein said pre and post guide members guide the wire electrode through said respective guide bores in the normal straight line of travel and wherein the distances from said point to said first and second guide members are substantially equal.

71. A current pickup assembly for placing electric current on an electrical discharge machine apparatus moving wire electrode having a normal straight line of travel, said current pickup assembly comprising:
- a conductive body;
- a bore in said conductive body for receiving the wire electrode therethrough, said bore having a longitudinal axis and a wire contact wall; and,
- wherein said bore longitudinal axis is at an angle with respect to the normal straight line of wire travel and wherein in cross section, said bore longitudinal axis appears to intersect the normal straight line of wire travel at a point and, the moving wire electrode contacts said contact wall on one side at one end of said point and contacts said contact wall on the other side at the other end of said point.

* * * * *

UNITED STATES PATENT AND TRADEMARK OFFICE
CERTIFICATE OF CORRECTION

PATENT NO. : 4,994,643

DATED : February 19, 1991

INVENTOR(S) : Thomas J. Truty et al.

It is certified that error appears in the above-identified patent and that said Letters Patent is hereby corrected as shown below:

Col. 19, line 20, after "said" insert --midpoint.--

Col. 20, line 57, after "said" insert --point.--

Col. 23, line 32, after "i" insert --ntersecting--.

Col. 24, line 27, after "62" insert --wherein--.

Signed and Sealed this

Twenty-third Day of March, 1993

Attest:

STEPHEN G. KUNIN

*Attesting Officer*     Acting Commissioner of Patents and Trademarks